US011060946B1

(12) United States Patent
Goehring et al.

(10) Patent No.: US 11,060,946 B1
(45) Date of Patent: Jul. 13, 2021

(54) LEAK MONITORING, ALARM AND CONTROL SYSTEM FOR MACHINERY STUFFING BOXES

(71) Applicant: Tyrion Integration, Bakersfield, CA (US)

(72) Inventors: Mark Goehring, Bakersfield, CA (US); David Pitzer, Bakersfield, CA (US)

(73) Assignee: Tyrion Integration Services, Inc., Bakersfield, CA (US)

( * ) Notice: Subject to any disclaimer, the term of this patent is extended or adjusted under 35 U.S.C. 154(b) by 2 days.

(21) Appl. No.: 16/773,828

(22) Filed: Jan. 27, 2020

(51) Int. Cl.
| *G01M 3/38* | (2006.01) |
| *E21B 43/12* | (2006.01) |
| *E21B 47/008* | (2012.01) |
| *E21B 47/047* | (2012.01) |
| *E21B 47/00* | (2012.01) |
| *E21B 33/08* | (2006.01) |
| *H04N 5/232* | (2006.01) |
| *H04N 7/18* | (2006.01) |
| *G08B 5/22* | (2006.01) |
| *H04N 5/225* | (2006.01) |

(52) U.S. Cl.
CPC ............ *G01M 3/38* (2013.01); *E21B 33/08* (2013.01); *E21B 43/126* (2013.01); *E21B 47/00* (2013.01); *E21B 47/008* (2020.05); *E21B 47/047* (2020.05); *H04N 5/23203* (2013.01); *H04N 7/183* (2013.01); *H04N 7/188* (2013.01); *E21B 43/127* (2013.01); *G08B 5/222* (2013.01); *H04N 2005/2255* (2013.01)

(58) Field of Classification Search
CPC ...... G01M 3/38; E21B 47/008; E21B 43/126; H04N 5/23203; H04N 7/188; H04N 7/183; H04N 2005/2255; G08B 5/222
See application file for complete search history.

(56) References Cited

U.S. PATENT DOCUMENTS

2019/0100990 A1\* 4/2019 Chavez Rico ............ G06T 7/74

\* cited by examiner

*Primary Examiner* — Jared Walker
(74) *Attorney, Agent, or Firm* — James M. Duncan; Scanlon Duncan LLP (57) ABSTRACT

A stuffing box leak detection system utilizes a reflective member on the outside surface of the stuffing box. A photoelectric sensor emits a light beam which is directed at the reflective member and a reflective beam is reflected back to the photoelectric sensor by the reflective member. A processor is connected to the photoelectric sensor, where the processor is configured to detect a change in intensity of the reflected beam. Upon detecting a change in the intensity of the reflected beam, the processor activates a trip alarm. Notifications of the trip alarm may be distributed to preselected recipients. The processor may also activate a camera directed at the stuffing box to provide still images or live stream video to recipients.

20 Claims, 8 Drawing Sheets

LEAK MONITORING, ALARM AND CONTROL SYSTEM FOR MACHINERY STUFFING BOXES

BACKGROUND OF THE INVENTION

This invention relates to the detection of leakage of stuffing boxes which provide a seal between a reciprocating or rotating shaft to prevent leaking of fluids and liquids. In the oil industry, stuffing boxes are commonly utilized to seal around a polish rod which reciprocates within a wellhead thereby reciprocating a string of rods within a string of tubing. The stuffing box contains internal packing elements which seal against the surface of the polish rod, thereby preventing produced fluid from escaping into the atmosphere.

Many oil wells do not have sufficient pressure at the producing zone to overcome the necessary hydrostatic pressure to produce the reservoir fluids to the ground surface. Producing such wells requires the use of some type of artificial lift equipment to bring the oil and associated water to the ground surface. One of the most common types of artificial lift devices is the subsurface rod pump. The subsurface rod pump is run into the well on a string of rods and placed below the fluid level maintained within the well. The rod pump, which is usually a positive displacement pump, is operated by reciprocating the string of rods up and down with a pumping unit set at the ground surface. The string of rods is connected to the pumping unit with a polish rod. A stuffing box, set on the production tree which in turn is attached to the top of the wellhead, encloses packing which seals around the polish rod and allows the polish rod to reciprocate up and down, hopefully maintaining a fluid-tight seal around the polish rod.

Unfortunately, stuffing boxes commonly leak. As the polish rod reciprocates through the packing elements, the packing elements begin to deteriorate from friction, heat and abrasion. The operator will commonly attempt to stop the leakage by tightening the stuffing box or replacing the packing elements. However, the operator may not realize there is a problem until a leak is observed. If the well is located in a remote location, considerable time may pass before the stuffing box leak is detected, resulting in substantial leakage of oil and other produced fluids. Such releases are undesirable because of the potential adverse impact on the environment and wildlife. Such releases can also be costly because of the clean-up expense, the potential liability for fines, and the loss of product. Many regulatory agencies have adopted a zero tolerance for oil releases into the environment and may shut down an operator's producing operation if such leaks occur.

A variety of stuffing box leak detection systems are known. However, a simple, reliable, and relatively inexpensive system remains desirable.

SUMMARY OF THE INVENTION

The present invention is directed to a stuffing box leak detection system which satisfies the above-identified need. Embodiments of the present invention detect leakage from a stuffing box of the type having an outside surface and an interior passage having a packing seal element disposed therein, where a polish reciprocates through the interior passage, where the packing seal element is compressed against the polish rod to form a liquid seal.

In one embodiment of the stuffing box leak detection system, a reflective member is affixed to an outside surface of the stuffing box. A photoelectric sensor is disposed adjacent to the stuffing box, where the photoelectric sensor emits a light beam directed at the reflective member and reflected beam is reflected back by the reflective member. A processor is connected to the photoelectric sensor, where the processor is configured to a detect a change in the intensity of the reflected beam if the reflective member is at least partially coated by an opaque substance. The processor comprises a transmitter which, upon the change in intensity of the reflected beam, a notification is generated and transmitted by the transmitter.

In embodiments of the stuffing box leak detection system, the reflective member may comprise a piece of reflective tape, a reflective paint, an embedded reflective surface, or an attached reflective plate.

In embodiments of the stuffing box leak detection system, the notification may comprise a text message to one or more designated cell phone numbers or one or more emails to one or more designated email addresses.

Embodiments of the stuffing box leak detection system may further comprise a camera which is disposed adjacent to the stuffing box with the camera lens directed at the stuffing box. The camera is in communication with the processor, where the camera is configured to receive an output signal from the processor and, upon receipt of the output signal, to photograph the stuffing box and create a digital image thereof. The digital image may be transmitted by the camera to the processor. The digital image may thereafter be transmitted by the processor to a pre-programmed recipient.

Embodiments of the invention further comprise a method of notifying an operator of a leak in a stuffing box. The steps in the method comprise directing a light beam of a photoelectric sensor at a stuffing box, where the stuffing box comprises a reflective member. A reflective beam reflected by the reflector member is monitored and ascertaining whether there is a change in an intensity of the reflective beam. If a change in intensity is detected, a notification is generated. The notification may thereafter be sent out via email, text message or the like.

DETAILED DESCRIPTION OF THE EMBODIMENTS

Figure 1:
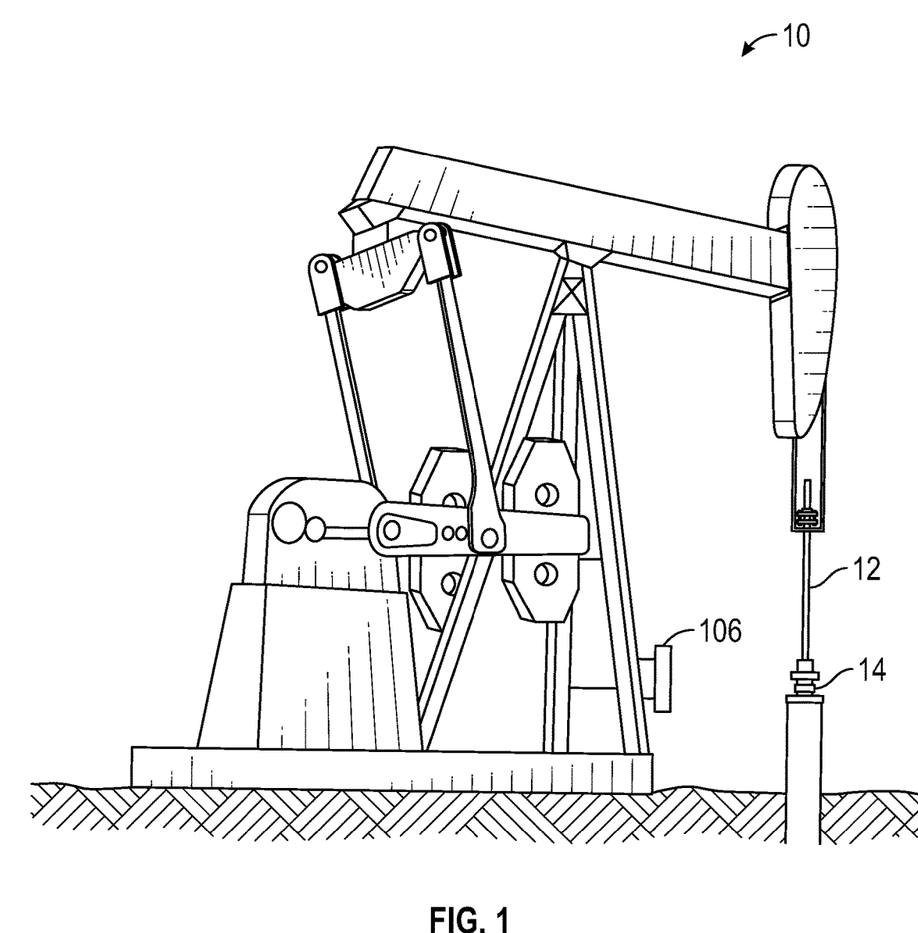
FIG. 1 depicts an embodiment of the invention utilized in conjunction with an oil pumping unit which reciprocates a polish rod within a stuffing box.

Referring now specifically to the drawings, FIG. 1 shows an oil well pumping unit 10 which is utilized to reciprocate a rod string to operate a subsurface pump to lift fluid to the surface. A polish rod 12 is attached to the top of the rod string. The polish rod 12 reciprocates within a stuffing box 14. FIG. 1 shows one possible location for a processor 106 of an embodiment of the leak detection system 100.

Figure 2:
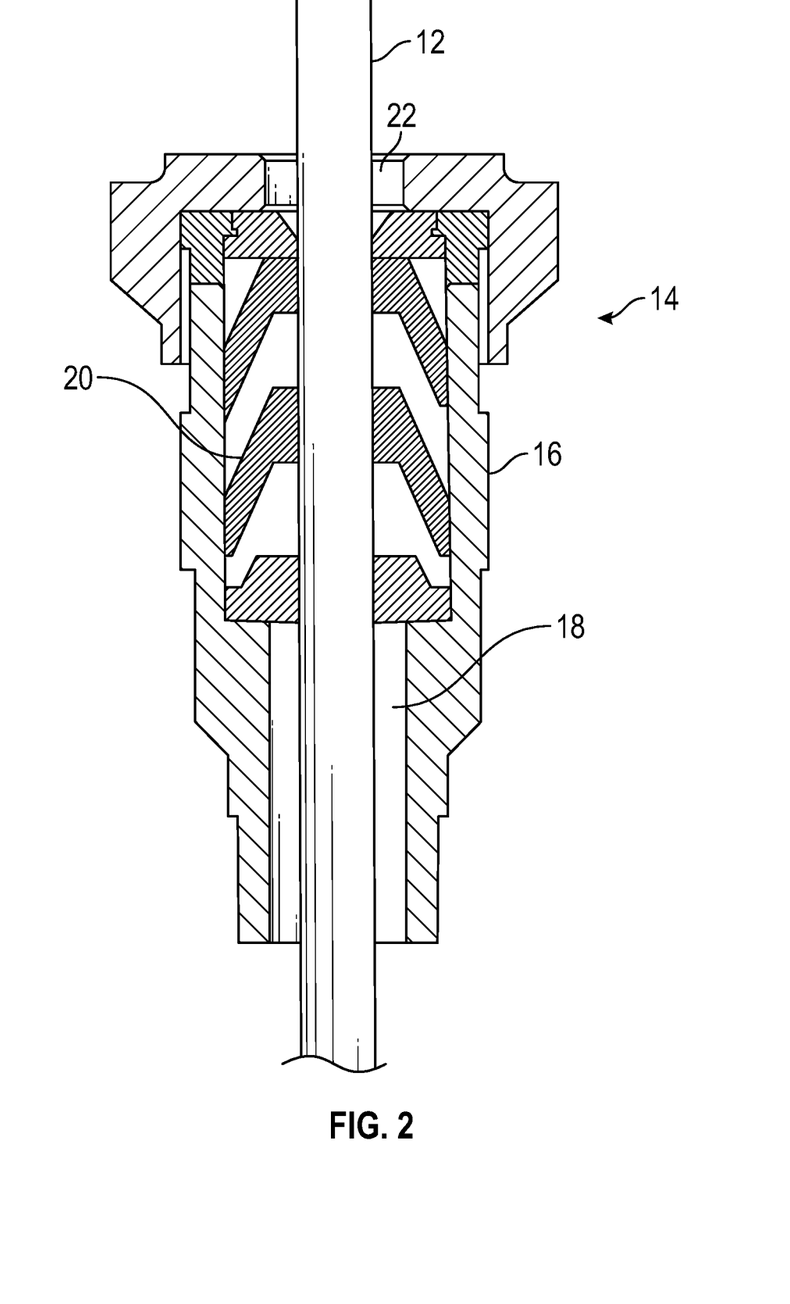
FIG. 2 depicts a sectional view of a stuffing box having a polish rod disposed therein.

FIG. 2 depicts a sectional view of one style of stuffing box 14. The stuffing box 14 has an outside surface 16 and an inner passage 18. Packing seal elements 20 are disposed within the inner passage 18. The packing seal elements 20 are compressed against the polish rod 12 to form a fluid seal. It is to be appreciated that FIGS. 1-2 illustrate a common embodiment of a stuffing box-polish rod combination. However, other types of stuffing boxes, such as those used in positive displacement surface pumps, may also benefit from the leak detection system disclosed herein.

Figure 3:
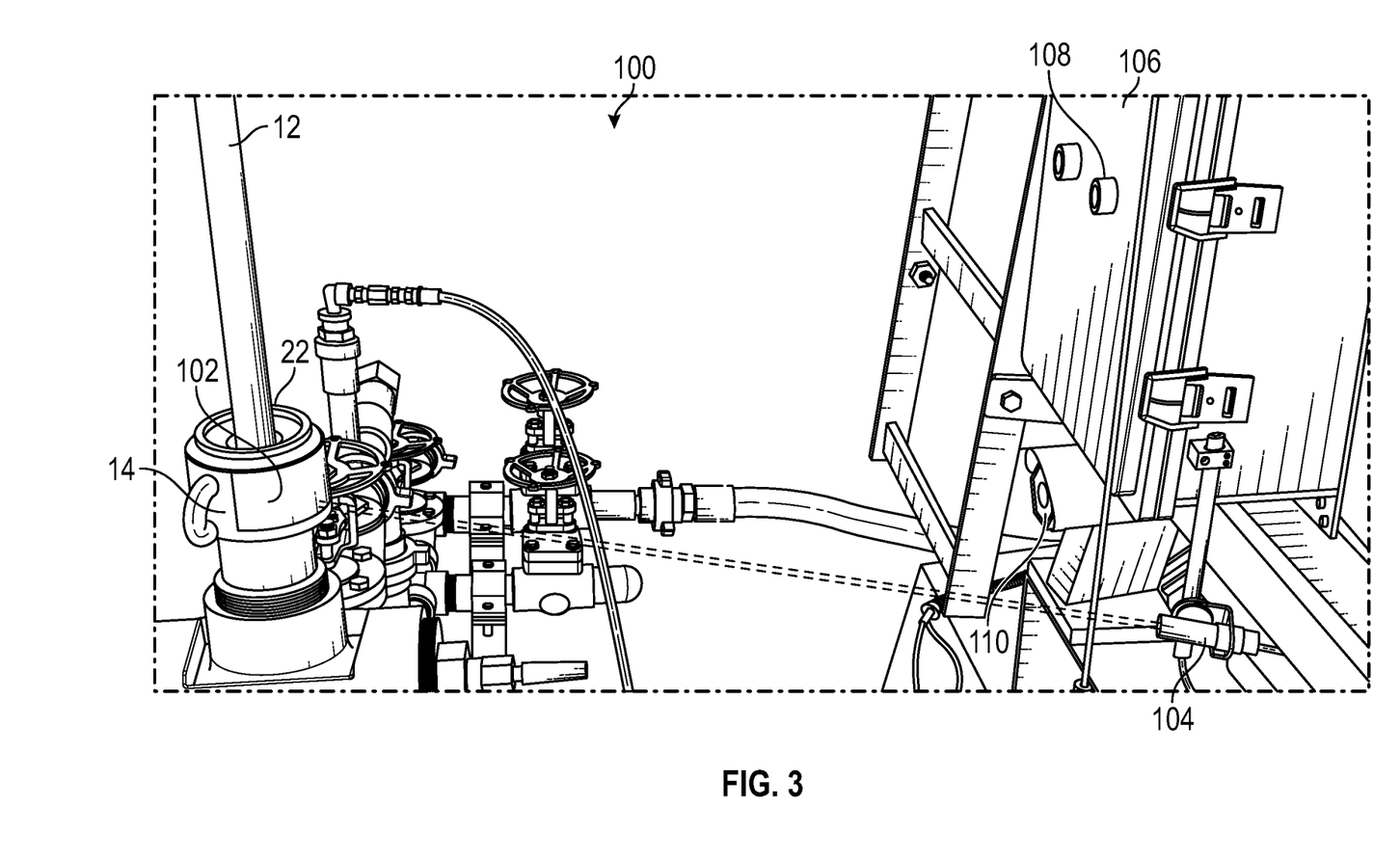
FIG. 3 depicts an embodiment of the invention showing a side view of the various components.
Figure 4:
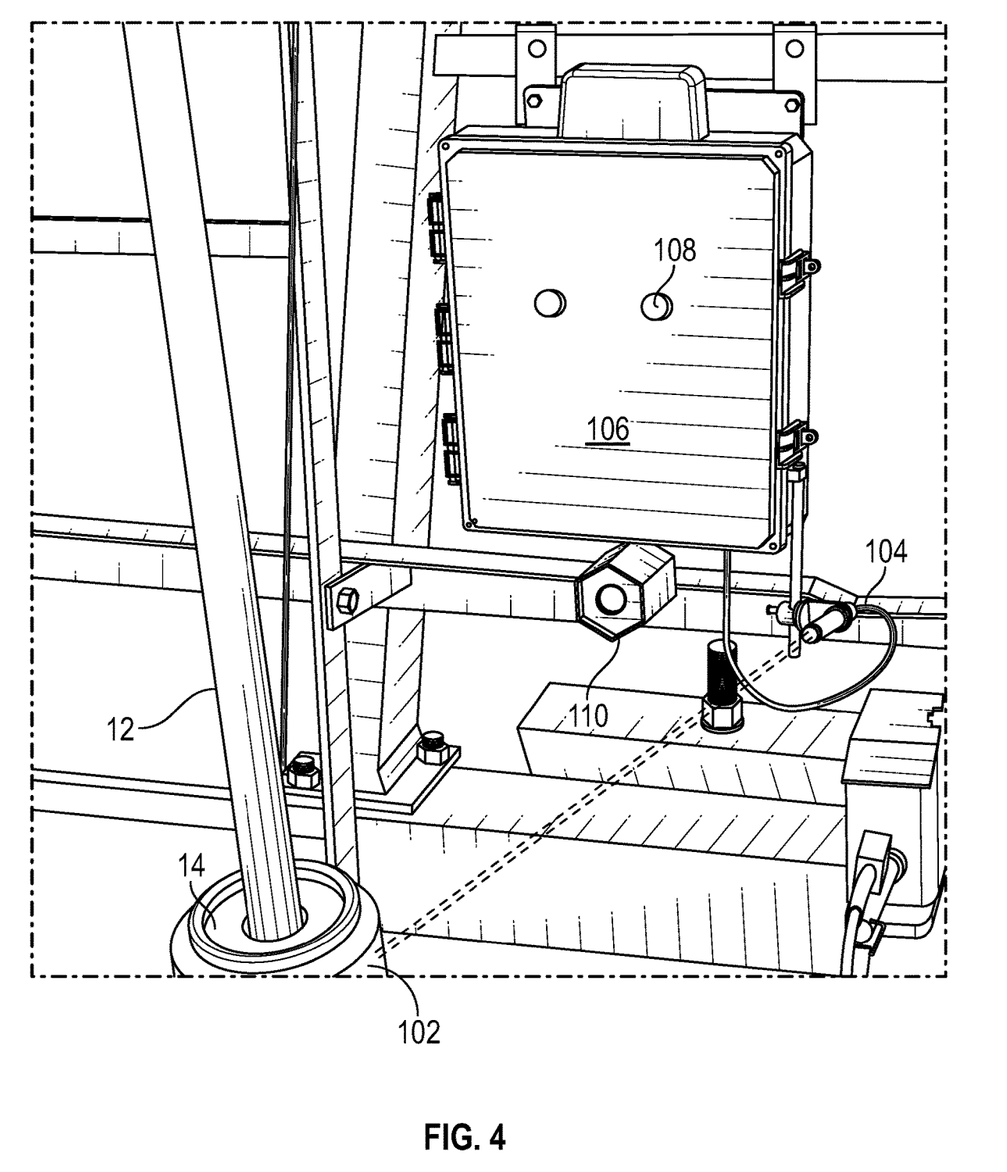
FIG. 4 depicts an embodiment of the invention showing a view of the from the position of the stuffing box.
Figure 5:
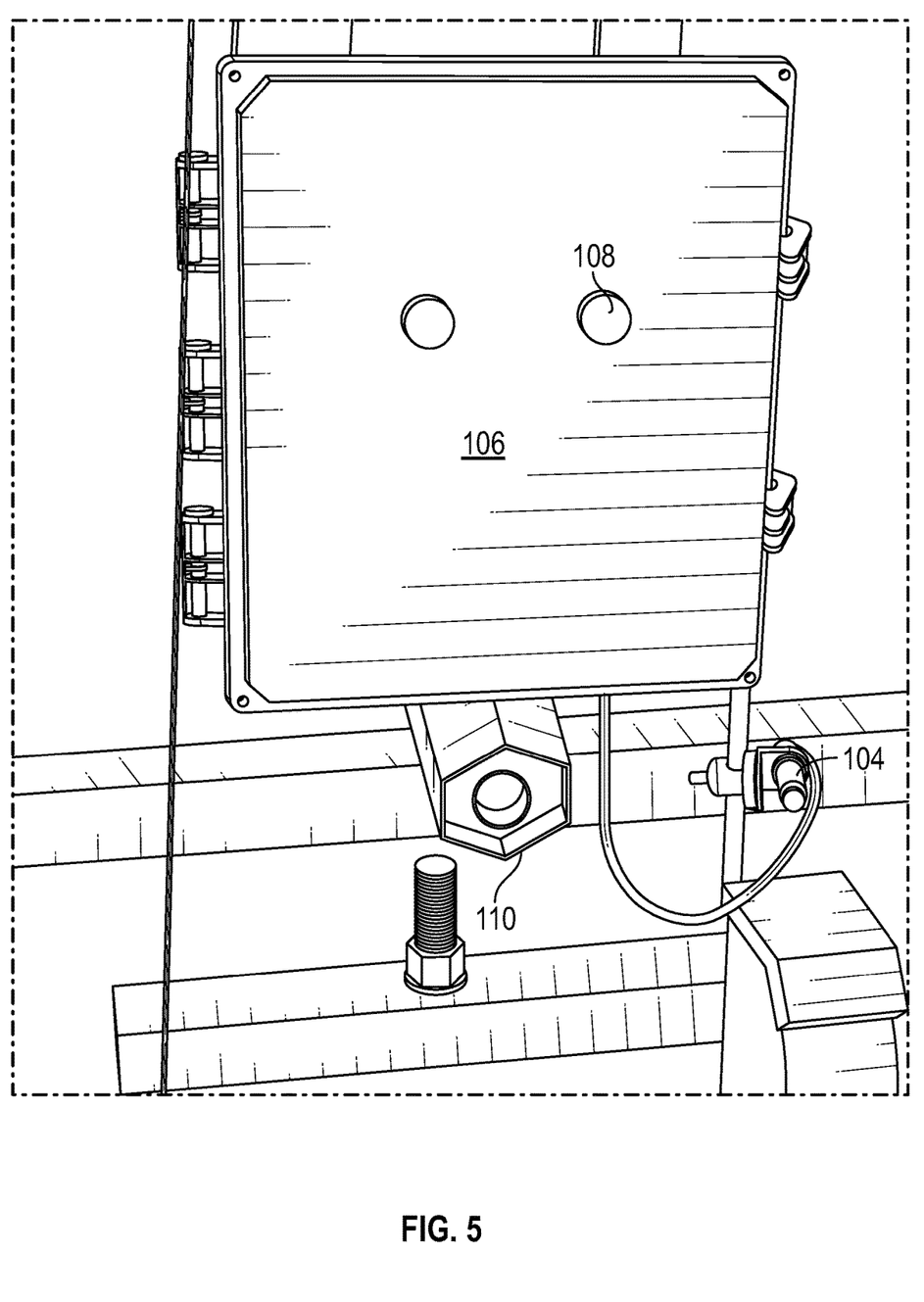
FIG. 5 depicts embodiments of the photoelectric sensor, a processor, and a camera.

FIGS. 3-5 depict an embodiment of the presently disclosed leak detection system 100. The leak detection system 100 has a reflective member 102 which comprises a portion of the outside surface 16 of the stuffing box 14. Reflective member 102 may be a piece of reflective tape attached to the outside surface 16. Alternatively, reflective member 102 may be a patch of reflective paint painted on the outside surface 16. Alternatively, reflective member 102 may be a reflective plate which affixed to the outside surface 16 by adhesive or fasteners. Alternatively, the stuffing box may be fabricated such that it has an embedded reflective surface which may comprise a portion of the outside surface of the stuffing box.

The leak detection system also has a photoelectric sensor 104. The photoelectric sensor 104 emits a light beam, either visible or infrared, which is directed at the reflective member 102. The reflective member generates a reflected beam which is reflected back by the reflective member 102 to the photoelectric sensor 104.

Figure 6:
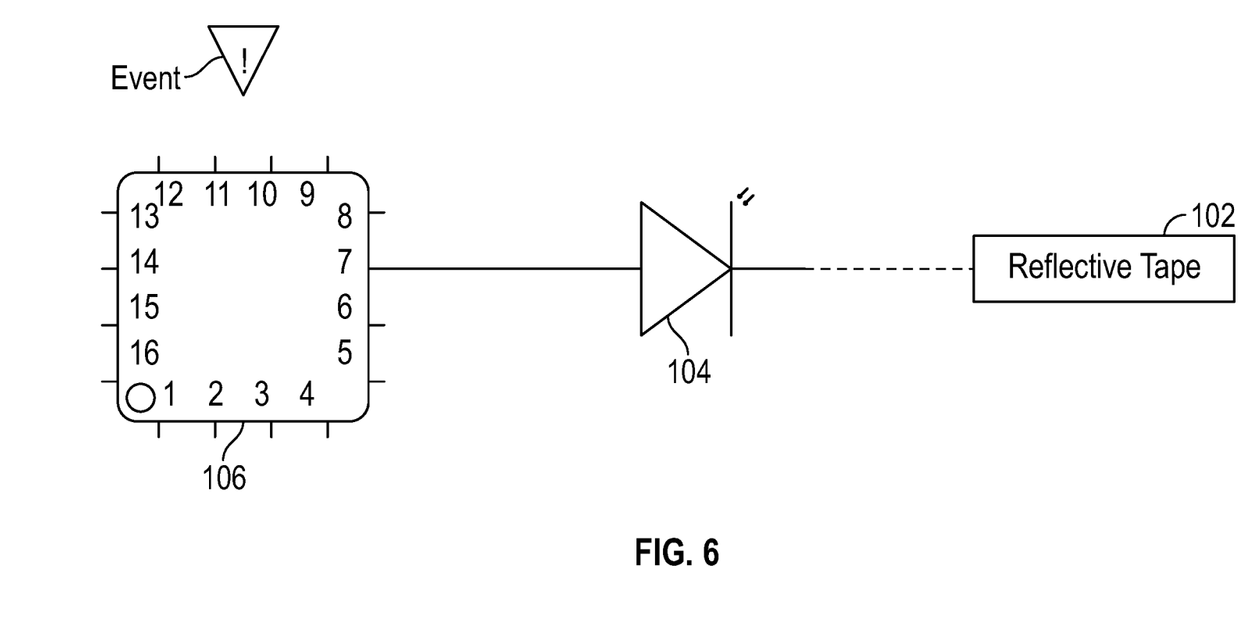
FIG. 6 schematically depicts an embodiment of the invention in which the system is configured to detect a coating of the reflective member in the event of a stuffing box leak.

A processor 106 is connected to the photoelectric sensor 104 and receives data regarding the light beam and the reflected beam. The processor 106 is configured to ascertain whether there is a change in intensity in the reflected beam. Such a change in intensity will occur if the reflective member is at least partially coated with some opaque substance which will likely occur in the event that there is a stuffing box leak. Stuffing box leaks typically occur around the packing elements 20 resulting in fluid escaping through the top 22 of the stuffing box 14, which will drip down over the outside surface 16 of the stuffing box, including over the reflective member 102. When such an event occurs, as schematically indicated in FIG. 6, there will be a change in the intensity of the reflected beam, which is detected by the processor 106 and a trip indication indicated on a local panel light 108. A trip indication may also be provided on a remote panel. Depending upon the settings of the processor, even the leak of a clear fluid, such as water, may be detected by a change in reflected beam intensity.

Figure 7:
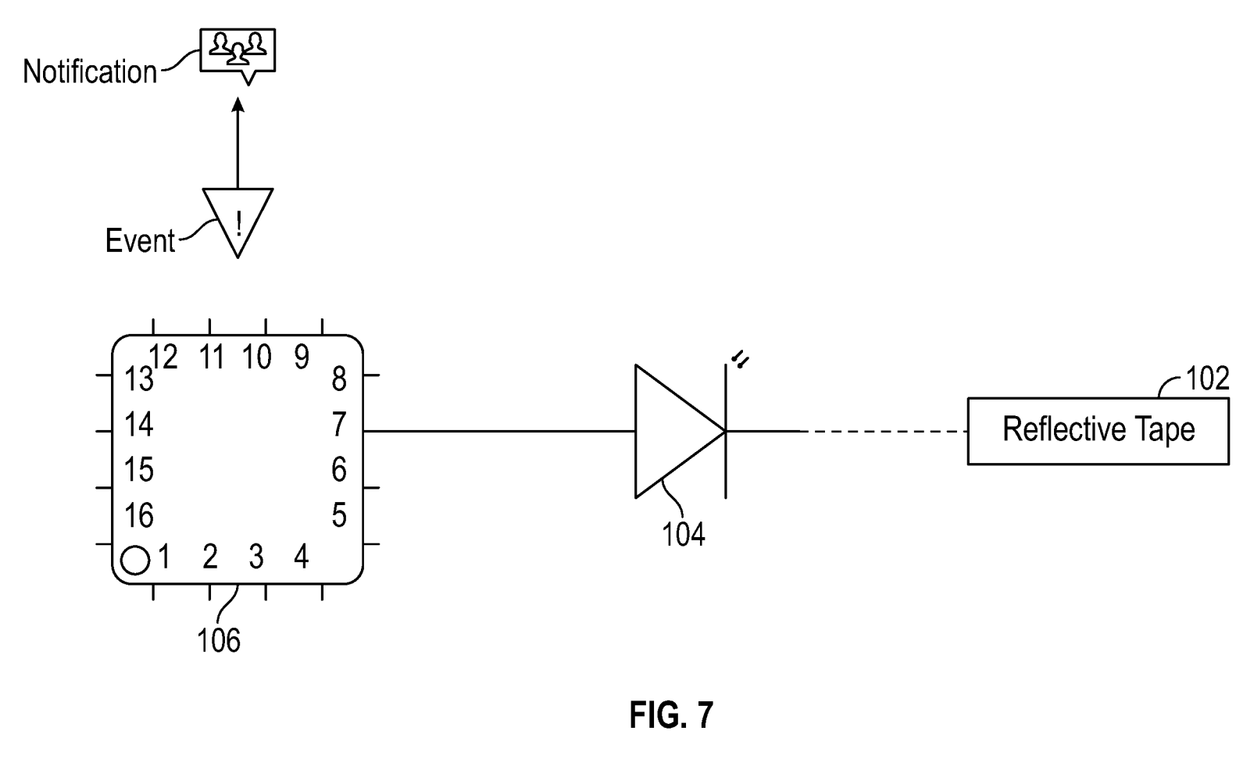
FIG. 7 schematically depicts an embodiment of the invention in which the system is configured to detect a coating of the reflective member in the event of a stuffing box leak and to generate a notification reporting the leak.

The processor 106 may also generate a notification upon detecting a change in the intensity of the reflective beam, as schematically indicated in FIG. 7. The notification may be distributed to a preselected group of contacts by email and/or text message.

Figure 8:
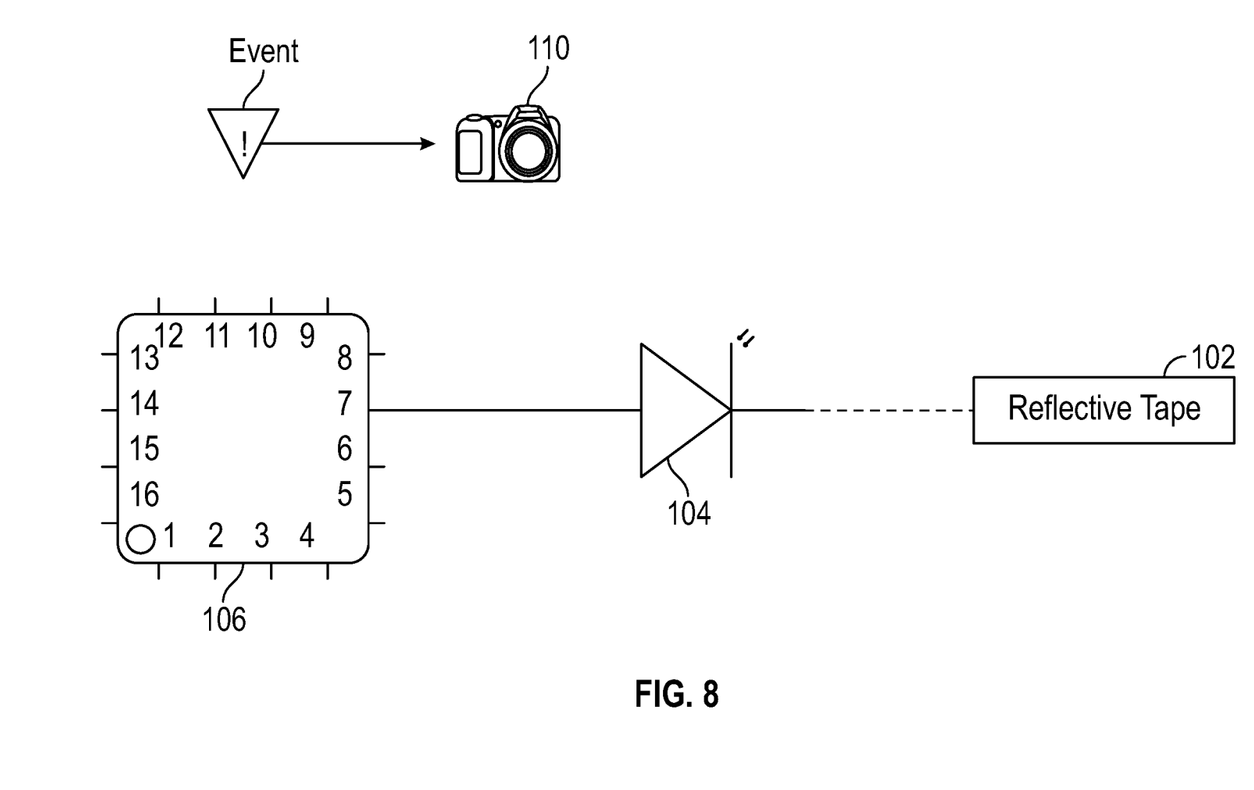
FIG. 8. schematically depicts an embodiment of the invention in which the system is configured to detect any coating of the reflective member in the event of a stuffing box leak and to direct a camera to photograph the stuffing box and transmit one or more photographs.

Embodiments of the leak detection system 100 may also comprise a camera 110 which is directed facing the stuffing box 14 as schematically indicated in FIG. 8. Camera 110 may either provide single shots or continuous live stream images of the stuffing box 14. A user may remotely activate camera 110 to obtain real time monitoring of the stuffing box by communicating with the processor 106 to generate an output signal which is transmitted to the camera. Camera 110 may also be triggered by the processor when the processor detects a change in the intensity of the reflective beam. Upon being activated by the processor, the camera may obtain digital images of the stuffing box, where the digital images may be forwarded to preselected group of contacts as either single digital images or as live stream video

Having thus described the preferred embodiment of the invention, what is claimed as new and desired to be protected by Letters Patent includes the following:

1. In a stuffing box comprising an outside surface and an interior passage having a packing seal element disposed therein, through which packing seal element a polish rod reciprocates, where the packing seal element is compressed against the polish rod to form a fluid seal, a leak detection system comprises:
    a reflective member comprising a portion of the outside surface of the stuffing box;
    a photoelectric sensor which emits a light beam directed at the reflective member and a reflected beam is reflected back by the reflective member; and
    a processor connected to the photoelectric sensor, the processor configured to detect a change in an intensity of the reflected beam if the reflective member is at least partially coated by an opaque substance, wherein the processor activates a trip alarm upon detecting a change in the intensity of the reflected beam.

2. The leak detection system of claim 1 wherein the reflective member comprises a piece of reflective tape affixed to the outside surface of the stuffing box.

3. The leak detection system of claim 1 wherein the reflective member comprises a reflective paint disposed to the outside surface of the stuffing box.

4. The leak detection system of claim 1 wherein the reflective member comprises an embedded surface comprising a portion of the outside surface.

5. The leak detection system of claim 1 wherein the reflective member comprises a reflective plate attached to the outside surface.

6. The leak detection system of claim 1 wherein the reflective member is selected from the group consisting of a reflective tape, a reflective paint, an embedded surface comprising a portion of the outside surface, or a reflective plate attached to the outside surface.

7. The leak detection system of claim 1 wherein the processor generates a notification comprising a text message when a change in the intensity of the reflected beam is detected.

8. The leak detection system of claim 1 wherein the processor generates a notification comprising an email when a change in the intensity of the reflected beam is detected.

9. The leak detection system of claim 1 further comprising a camera directed at the stuffing box, the camera configured to receive an output signal from the processor and, upon receipt of the output signal, to photograph the stuffing box and create a digital image thereof.

10. The leak detection system of claim 9 wherein the digital image is transmitted by the camera to the processor.

11. The leak detection system of claim 10 wherein the digital image is transmitted by the processor to a pre-programmed recipient.

12. The leak detection system of claim 9 wherein the output signal is generated by the processor when there is a change in the intensity of the reflected beam.

13. A method of notifying an operator of a leak in a stuffing box comprising the steps of:
   directing a light beam of a photoelectric sensor at a stuffing box comprising a reflective member;
   monitoring a reflective beam from the reflective member;
   ascertaining whether there is a change in an intensity of the reflective beam resulting from at least a portion of the reflective member being coated by an opaque substance; and
   generating a trip alarm if there is a change in the intensity of the reflective beam.

14. The method of claim 13 wherein the reflective member comprises a piece of reflective tape affixed to the outside surface of the stuffing box.

15. The method of claim 13 wherein the reflective member comprises an embedded surface comprising a portion of the outside surface.

16. The method of claim 13 wherein the reflective member comprises a reflective plate attached to the outside surface.

17. The method of claim 13 wherein the reflective member is selected from the group consisting of a reflective tape, a reflective paint, an embedded surface comprising a portion of the outside surface, or a reflective plate attached to the outside surface.

18. The method of claim 13 comprising the further step of directing a camera at the stuffing box, the camera configured to receive an output signal from the processor and, upon receipt of the output signal, to provide live stream images of the stuffing box.

19. The method of claim 18 comprising the further step of transmitting the live stream images to a pre-programmed recipient.

20. A leak detection system comprising:
   a reflective member comprising a portion of an outside surface of a stuffing box;
   a photoelectric sensor which emits a light beam directed at the reflective member and a reflected beam is reflected back by the reflective member to the photoelectric sensor;
   a processor connected to the photoelectric sensor, the processor configured to detect a change in intensity of the reflected beam, wherein the processor comprises a transmitter which, upon the change in intensity of the reflected beam, a notification is generated by the processor and transmitted by the transmitter.

* * * * *